United States Patent Office 3,417,104
Patented Dec. 17, 1968

3,417,104
CYCLIC CARBONATES
Fritz Hostettler and Eugene F. Cox, Charleston, W. Va., assignors to Union Carbide Corporation, a corporation of New York
No Drawing. Filed Sept. 26, 1963, Ser. No. 311,673
7 Claims. (Cl. 260—340.2)

This invention relates to the preparation of cyclic carbonate compounds. In various aspects, the invention relates to processes for producing said cyclic carbonate compounds.

The novel cyclic carbonate compounds which are contemplated can be characterized by the following formula
I

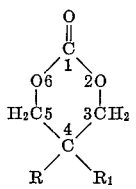

wherein R can be nitro (—NO₂) or tertiary amino

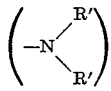

each R', individually, being a monovalent hydrocarbon radical, i.e., a hydrocarbyl radical, such as alkyl, cycloalkyl, aralkyl, alkenyl, cycloalkenyl, and the like; and wherein R₁ can be a monovalent hydrocarbon radical, e.g., alkyl, aryl, cycloalkyl, aralkyl, alkaryl, alkenyl, cycloalkenyl, and the like; or a hydrocarbyloxymethyl radical, e.g., alkoxymethyl, cycloalkoxymethyl, aryloxymethyl, alkaryloxymethyl, aralkoxymethyl, alkenyloxymethyl, cycloalkenyloxymethyl, alkenylbenzyloxymethyl, and the like. It is preferred that R be a nitro radical and the R₁ be a hydrocarbyl radical or a hydrocarbyloxymethyl radical which contains ethylenic unsaturation >C=C< e.g., alkenyl, alkenyloxymethyl, cycloalkenyloxymethyl, alkenylbenzyloxymethyl, and the like. It is further preferred that the R and R₁ radicals, individually, contain no more than 12 carbon atoms each.

Illustrative R radicals include, among others, the dialkylaminos, preferably the di(lower alkyl)aminos, e.g., dimethylamino, diethylamino, diisopropylamino, di-n-butylamino, di-sec-butylamino, di-t-butylamino, diisobutylamino, di-2-ethylhexylamino, didodecylamino, dioctadecylamino, and the like; the dicycloalkylaminos, especially those which contain from 5 to 6 carbon atoms in the cycloaliphatic nucleus, e.g., dicyclopentylamino, dicyclohexylamino, di(lower alkyl-substituted cyclohexyl) amino, and the like; diallylamino; dicrotylamino; and the like.

With further reference to Formula I supra, illustrative R₁ radicals include for example, the alkyls, e.g., methyl, ethyl, n-propyl, isopropyl, n-butyl, sec-butyl, t-butyl, isobutyl, n-hexyl, 2-ethylhexyl, dodecyl, octadecyl, and the like; the cycloalkyls, especially those which contain from 5 to 7 carbon atoms in the cycloaliphatic nucleus, e.g., cyclopentyl, cyclohexyl, cycloheptyl, alkylcyclopentyl, alkylcyclohexyl, alkylcycloheptyl, and the like; the aryls, e.g., phenyl, naphthyl, anthryl, biphenylyl, and the like; the aralkyls, e.g., benzyl, phenethyl, phenylbutyl, and the like; the alkaryls, e.g., tolyl, xylyl, ethylphenyl, octylphenyl, and the like; the alkenyls, e.g., vinyl, allyl, crotyl, 3-butenyl, 2-methylpropenyl, 2-ethylhexenyl, and the like; the cycloalkenyls, especially those which contain from 5 to 6 carbon atoms in the cycloaliphatic nucleus, e.g., cyclopentenyl, cyclohexenyl, lower alkyl substituted cyclohexenyl, and the like; the alkoxymethyls, preferably the lower alkoxymethyls, e.g., methoxymethyl, ethoxymethyl, propoxymethyl, n-butoxymethyl, t-butoxymethyl, isobutoxymethyl, 2-ethylhexoxymethyl, decoxymethyl, and the like; the cycloalkoxymethyls, especially those which contain from 5 to 7 carbon atoms in the cycloaliphatic nucleus, e.g., cyclopentoxymethyl, cyclohexoxymethyl, cyclohexoxymethyl, cycloheptoxymethyl, lower alkyl substituted cyclohexoxymethyl, and the like; phenoxymethyl; benzyloxymethyl; naphthyloxymethyl; tolyloxymethyl; xylyloxymethyl; epthylphenoxymethyl; and the like; the alkenyloxymethyls, e.g., vinyloxymethyl, allyloxymethyl, 3-butenyloxymethyl, 4-pentenyloxymethyl, 4-octenyloxymethyl, and the like; the cycloalkenyloxymethyls, especially those which contain from 5 to 6 carbon atoms in the cycloaliphatic nucleus, e.g., cyclopentenyloxymethyl, cyclohexenyloxymethyl, alkyl substituted cyclohexenyloxymethyl, and the like; the alkenylbenzyloxymethyls, e.g., vinylbenzyloxymethyl, allylbenzyloxymethyl, 4-pentenylbenzyloxymethyl, and the like. It is pointed out at this time that the terms a "lower alkyl" radical or a "lower alkoxy" radical, as used herein, includes those radicals which contain from 1 to 6 carbon atoms therein.

Exemplary classes of novel cyclic carbonate compounds include 4-nitro-4-alkyl-2,6-dioxacyclohexanone,
4-dialkylamino-4-alkyl-2,6-dioxacyclohexanone,
4-nitro-4-aryl-2,6-dioxacyclohexanone,
4-dialkylamino-4-aryl-2,6-dioxacyclohexanone,
4-nitro-4-alkenyloxymethyl-2,6-dioxacyclohexanone,
4-nitro-4-cycloalkenyloxymethyl-2,6-dioxacyclohexanone,
4-nitro-4-alkenylbenzyloxymethyl-2,6-dioxacyclohexanone,
4-dialkylamino-4-alkenyloxymethyl-2,6-dioxacyclohexanone,
4-dialkylamino-4-cycloalkenyloxymethyl-2,6-dioxacyclohexanone,
4-nitro-4-alkenyl-2,6-dioxacyclohexanone,
4-nitro-4-cycloalkenyl-2,6-dioxacyclohexanone,
4-nitro-4-alkoxymethyl-2,6-dioxacyclohexanone,
4-nitro-4-aryloxymethyl-2,6-dioxacyclohexanone, and the like.

Specific examples of the novel cyclic carbonate compounds include, for instance, 4 - nitro - 4 - methyl -2, 6 - dioxacyclohexanone, 4 - nitro - 4 - isobutyl - 2, 6 - dioxacyclohexanone, 4 - nitro - 4 - dodecyl - 2, 6 - dioxacyclohexanone, 4 - dimethylamino - 4 - ethyl - 2, 6 - dioxacyclohexanone, 4 - diisopropylamino - 4 - isopropyl-2,6 - dioxacyclohexanone, 4 - nitro - 4 - phenyl - 2,6 - dioxacyclohexanone, 4 - nitro - 4 - cyclohexyl -2,6 - dioxacyclohexanone, 4 - nitro - 4 - phenethyl - 2,6 - dioxacyclohexanone, 4 - di - sec - butylamino - 4 - benzyl-2,6 - dioxacyclohexanone, 4 - nitro - 4 - vinyloxy - methyl - 2,6 - dioxacyclohexanone, 4 - nitro - 4 - allyloxymethyl - 2,6 - dioxacyclohexanone, 4 - nitro - 4 - (3 - butenyloxymethyl) - 2,6 - dioxacyclohexanone, 4 - nitro - 4 - (5 - hexenyloxymethyl) - 2,6 - dioxacyclohexanone, 4 - nitro - 4 - cyclohexenyloxymethyl - 2,6 - dioxacyclohexanone, 4 - nitro - 4 - vinyl - benzyloxymethyl - 2,6 - dioxacyclohexanone, 4 - nitro - 4 - allylbenzyloxymethyl - 2,6 - dioxacyclohexanone, 4 - dimethylamino - 4 - allyloxymethyl - 2,6 - dioxacyclohexanone, 4 - diethylamino - 4 - allyloxymethyl - 2,6 - dioxacyclohexanone, 4 - diisopropylamino - 4 - allyloxymethyl - 2,6 - dioxacyclohexanone, 4 - dibutylamino - 4 - allyloxymethyl - 2,6 - dioxacyclohexanone, 4 - nitro - 4 - allyl - 2,6 - dioxacyclohexanone, 4 - nitro - 4 - crotyl - 2,6 - dioxacyclohexanone, 4 - nitro - 4 - cinnamyl - 2,6 - dioxacyclohexanone, 4 - nitro - 4 - (3 - butenyl) - 2,6 - dioxacyclohexanone 4 - nitro - 4 - (2 - octenyl) - 2,6 - dioxacyclohexanone, 4 - nitro - 4 - cyclohexenyl - 2,6 - dioxacyclohexanone, 4 - nitro - 4 - phenoxymethyl - 2,6 - dioxacyclohexanone, 4 - nitro - 4 - xylyloxymethyl - 2,6 - dioxacyclohexanone, 4 - nitro - 4 - methoxymethyl - 2,6 - dioxacyclohexanone, 4 - nitro - 4 - ethoxymethyl - 2,6 - dioxacyclohexanone, 4 - nitro - 4 - (2 - ethylhexoxymethyl) - 2,6 - dioxacyclohexanone, and the like.

The preparation of 4 - nitro - 4 - hydrocarbyloxymethyl - 2,6 - dioxacyclohexanone such as 4 - nitro - 4 - alkoxymethyl - 2,6 - dioxacyclohexanone, 4 - nitro - 4 - aryloxymethyl - 2,6 - dioxacyclohexanone, 4 - nitro - 4 - alkenyloxymethyl - 2,6 - dioxacyclohexanone, 4 - nitro - 4 - cycloalkenyloxymethyl - 2,6 - dioxacyclohexanone, 4 - nitro - 4 - alkenylbenzyloxymethyl - 2,6 - dioxacyclohexanone, etc., is effected by the following sequence of steps:

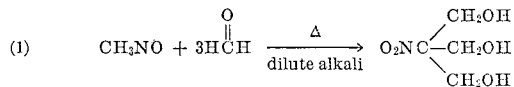

Equation 1 supra represents an aldol-like condensation reaction which can be conducted in the presence of a basic catalyst, e.g., a dilute alkali metal hydroxide solution, at an elevated temperature. The product, i.e., tris(hydroxymethyl)nitromethane, is then contacted with a hydrocarbyl halide such as an alkenyl halide, cycloalkenyl halide, alkenylbenzyl halide, alkyl halide, aryl halide, etc., which is designated as R″X in Equation 2 below:

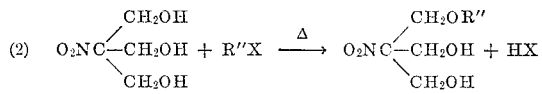

The resulting monoetherified product then can be reacted with phosgene, preferably in the presence of, for example, an alkali metal hydroxide, alkaline earth metal hydroxide, or a tertiary amine such as triethylamine, pyridine, etc., at a temperature of from about 0° C. to about 50° C., and higher, to produce the nitro substituted carbonate compound. Alternatively, the product of Equation 2 can be reacted with the dialkyl carbonates

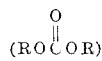

e.g., diethyl carbonate, etc., or the alkylene carbonates, e.g., ethylene carbonate, propylene carbonate, etc., in the presence of a transesterification catalyst such as alkali metal alkoxides, alkaline earth metal alkoxides, e.g., the methoxides, ethoxides, etc., of the Group I and II metals; the titanates having the general formulae $Y_2TiO_3$ and $Y_4TiO_4$ in which the Y's are alkyl, aryl, or aralkyl radicals. The tin compounds, the organic salts of lead, and the organic salts of manganese which are described in U.S. 2,890,208 as well as the metal chelates and metal acylates disclosed in U.S. 2,878,236 can be employed as exemplified transesterification catalysts. The disclosures of the aforesaid patents are incorporated by reference into this specification. Equation 3 infra illustrates the cyclization step whereby the nitro substituted carbonate compound is formed.

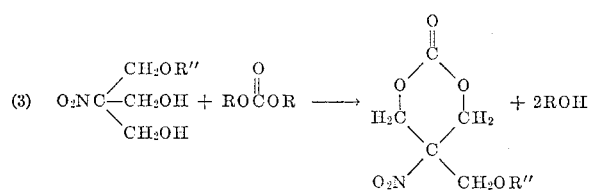

The preparation of the 4 - t - amino - 4 - hydrocarbyl - oxymethyl - 2,6 - dioxacyclohexanones can be accomplished by contacting the monoetherified product of Equation 2 supra with hydrogen, in the presence of conventional hydrogenation catalysts, e.g., Raney nickel, platinum, and the like, at an elevated temperature, e.g., from about 50° C. to about 200° C., followed by reacting the resulting amino substituted monoetherified product with a stoichiometric excess of hydrocarbyl halide (R‴X), and then cyclizing the tertiary amino product as illustrated in Equation 3 supra.

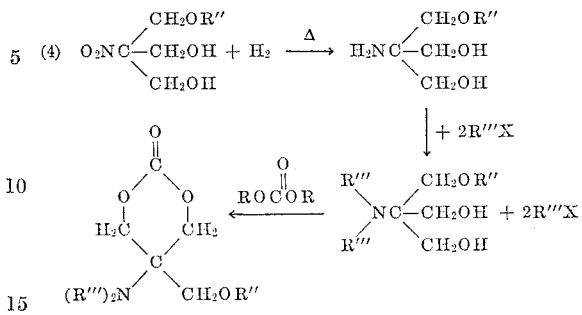

The preparation of the novel 4-nitro-4-hydrocarbyl-2,6-dioxacyclohexanone and 4-t-amino-4-hydrocarbyl-2,6-dioxacyclohexanone, can be prepared by the reaction of a hydrocarbyl substituted nitromethane, i.e., $RCH_2NO_2$ wherein R in an alkyl, aryl, cycloalkyl, alkaryl, alkenyl, cycloalkenyl, etc., with an excess of formaldehyde as shown in the following equation:

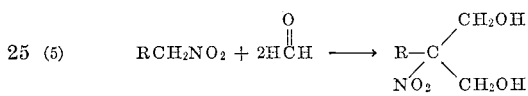

The resulting bis(hydroxymethyl) compound of Equation 5 then can be subjected to the cyclization step illustrated in Equation 3 supra, or it can undergo the sequence of steps illustrated in Equation 4 thus producing the various novel nitro and tertiary amino substituted carbonates.

The novel ethylenically unsaturated cyclic carbonates of Formula I can be homopolymerized through the ethylenic groups, or these novel carbonates can be copolymerized with other ethylenically unsaturated carbonate(s) or with other ethylenically unsaturated organic compound(s) (described hereinafter and termed "vinyl monomer," for brevity) through their ethylenic groups, preferably in the presence of a peroxide catalyst (described hereinafter), to give linear solid polymeric products which have utility in the molding, laminating, and coating arts, e.g., manufacture of plastic toys which can be rigid or flexible, paperweights, inkstands, etc.

Among the vinyl monomers which are contemplated are those which contain a polymerizable ethylenic bond. Illustrative vinyl monomers include, for example, styrene, alkylstyrene, chlorostyrene, ethylstyrene, dimethylstyrene, isopropylstyrene, divinylbenzene, alkyl acrylate, alkyl methacrylate, alkyl crotonate, methyl acrylate, ethyl acrylate, n-propyl acrylate, n-butylacrylate, methyl methacrylate, ethyl methacrylate, isopropyl methacrylate, n-amyl methacrylate, methyl crotonate, ethyl crotonate, n-propyl crotonate, t-butyl crotonate, 2-ethylhexyl crotonate, vinyl acetate, vinyl propionate, vinyl butyrate, vinyl valerate, and the like. Additional desirable monomeric ethylenically unsaturated compounds include, for instance, triallyl cyanurate, diallyl phthalate, triallylamine, acrylonitrile, allyl acrylate, allyl methacrylate, allyl crotonate, allyl butyrate, allyl 2-ethylhehexanoate, allyl benzoate, and the like.

The peroxide catalysts which can be employed include, for instance, benzoyl peroxide, methyl ethyl ketone peroxide, methyl isobutyl ketone peroxide, p-methane hydroperoxide, t-butyl hydroperoxide, cumene hydroperoxide, acetyl peroxide, cyclohexanone peroxide, lauroyl peroxide, di-t-butyl peroxide, t-butyl perbenzoate, and the like.

The operative conditions, e.g., temperature and pressure, are of the order employed in the vinyl-type polymerization arts, e.g., 75°–150° C.

The novel saturated as well as the ethylenically unsaturated cyclic carbonates of Formula I can be homopolymerized or copolymerized through the carbonate group, in the presence of catalysts such as n-butyllithium, di-n-butylzinc, and triisobutylaluminum, at a temperature of from about 0° to about 200° C., and for a period of time sufficient to produce high molecular weight solid products. The solid products which lack ethylenic unsaturation can be used in the moldings and laminating arts, for the manufacture of toys, paperweights, skis, and the like. The solid products which contain a plurality of pendant groups having ethylenic sites can be cured via procedures well recognized in the synthetic and natural rubber arts, e.g., sulfur cure, to give tough and/or rubbery and/or elastomeric products. These products are useful as gaskets, seals, flexible films, specialty tires, and the like.

The novel cyclic carbonate compounds of Formula I supra which contain ethylenic unsaturation can be contacted with an organic peracid to produce the corresponding vicinal-epoxide(s). Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acids, perbutyric acid, perhexanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracid, based on the total weight of peracid and inert organic vehicle is suitable; from about 20 to 40 weight percent of the peracid is preferred. The epoxidation reaction can be conducted at a temperature in the range of from about 0° C., and lower, to about 100° C., and higher, and preferably from about 20° C. to about 80° C. The ultimate epoxide product will depend upon the number of ethylenic bonds present in the cyclic carbonate reactant and the amount of peracid employed. Thus, substantial conversion of a monoethylenically unsaturated cyclic carbonate compound to the corresponding vicinal-epoxy cyclic carbonate compound is favored or accomplished by employing at least one mol of peracid per mol of said monoethylenically unsaturated cyclic carbonate, e.g., from about 1.0 to about 10 mols of peracid per mol of said carbonate. By way of a second illustration, if the cyclic carbonate contains two carbon to carbon double bonds, then substantial diepoxidation occurs by employing at least two mols of peracid per mol of diethylenically unsaturated cyclic carbonate. In general, then, the number of mols of peracid per mol of carbonate reactant which should be employed to effect essentially complete epoxidation is at least equal to, and generally greater than, the number of ethylenic sites contained in said carbonate reactant. When a polyethylenically unsaturated cyclic carbonate reactant is employed, one can also obtain a cyclic carbonate product which contains an ethylenic group(s) as well as a vicinal-epoxy(s) by employing, for example, equimolar quantities of the carbonate and peracid reactants, and more desirable still, by employing a molar excess of the carbonate reactant in relation to the peracid. In general, the epoxidation reaction is conducted for a period of time which is sufficient to introduce oxirane oxygen at the desired number of ethylenic sites in the carbonate reactant. Oftentimes, this reaction period is usually sufficient to essentially consume the quantity of peracid employed. Periodic analysis of samples of the reaction mixture to determine the quantity of peracid consumed during the epoxidation reaction can be readily performed by the operation of well-known techniques. At the termination of the epoxidation reaction, the unreacted ethylenically unsaturated carbonate precursor, acid by-product, inert vehicle, if employed, and the like, can be recovered from the reaction product mixture, for example, by distillation under reduced pressure. Further well-known procedures such as fractional distillation, and the like, can be used to purify the vicinal-epoxy cyclic carbonate product.

The vicinal-epoxy cyclic carbonate compounds are novel and useful. They can be characterized by the following formula:

II 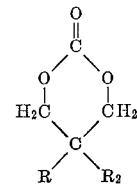

wherein R has the same values as the variable R of Formula I supra, and wherein $R_2$ is equal to the partially or completely epoxidized moieties of $R_1$ of Formula I supra, for example, vicinal-epoxyalkoxymethyl, vicinal-epoxyalkenyloxymethyl, di(vicinal-epoxy)alkoxymethyl, vicinal-epoxyalkylbenzyloxymethyl, vicinal - epoxycycloalkoxymethyl, and the like. The $R_2$ variables of Formula II supra are fully illustrated by merely substituting oxirane oxygen for one of the bonds in the carbon to carbon ethylenic unsaturation, i.e., converting $>C=C<$, to

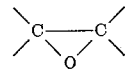

of the $R_1$ variables of Formula I supra.

The vicinal-epoxy cyclic carbonate compounds of Formula II can be homopolymerized, or these novel vicinal-epoxy cyclic carbonates can be copolymerized with other vicinal-epoxy cyclic carbonates or with other mono- or polyepoxides, preferably in the presence of an epoxy polymerization catalyst such as the metal halide Lewis acids, e.g., boron trifluoride, under typical epoxy polymerization conditions, to give solid polymeric products which are useful as paperweights, in the manufacture of toys, etc.

Among the mono- and polyepoxides which are contemplated include, among other, 4-vinylcyclohexene dioxide, dicyclopentadiene dioxide, divinylbenzene dioxide, 3,4-epoxy-6-methylcyclohexylmethyl, 3,4-epoxy-6-methylcyclohexanecarboxylate, diethylene glycol bis(3,4-epoxycyclohexanecarboxylate), bis(2,3-epoxycyclopentyl)ether, butadiene dioxide, phenyl glycidyl ether, 1,2-epoxydodecane, and the like.

In addition, the novel vicinal-epoxy cyclic carbonates of Formula II with or without a polyepoxide such as those illustrated previously, can be reacted with an active organic hardener such as polycarboxylic acids, polycarboxylic acid anhydrides, polyfunctional amines, polyols, polythiols, polyisocyanates, polyacyl halides, and the like, preferably in the presence of a typical epoxy polymerization catalyst, $BF_3$-etherate, under conventional curing conditions, to produce solid epoxy resins which are useful in the laminating, coatings, molding, and encapsulating arts.

The vicinal-epoxy cyclic carbonates of Formula II are also useful as plasticizers for polyvinyl chloride compositions.

The following examples are illustrative.

EXAMPLE I (A) Into a 2-liter three-neck flask are charged one mol of 1-nitroethane and 0.25 gram of calcium oxide. One hundred and sixty two grams of 37.5 percent Formalin solution (2 mols of formaldehyde) are added dropwise to the well-agitated reactant mixture. During formaldehyde addition the exotherm is removed by cooling with water, and the reaction temperature is not allowed to exceed 30° C. After about one half of the Formalin solution is added the reactant mixture becomes a single phase. After Formalin addition is complete the reactants are allowed to stand at room temperature for 48 hours. The calcium catalyst is now removed by percolation through a column of Amberlite IRC–50 ion-exchange resin. The column effluent is evaporated to dryness at 90° C. in vacuo. The resulting 2-nitro-2-methyl-1,3-propanediol is a solid melting at 149–150° C. after recrystallization from water.

(B) To a reaction flask equipped with stirrer, thermometer, and Dry Ice condenser there is charged 0.5 mol of 2-nitro-2-methyl-1,3-propanediol, one mol of toluene and 750 milliliters of toluene. The reactants are cooled to 0–5° C. One half mol of phosgene is added while the temperature of the reactants is maintained at 10–15° C. Upon completion of phosgene addition the reactants are allowed to warm to room tempearture. The amine hydrochloride is removed by filtration and the toluene filtrate is set aside. A substantial portion of the carbonate remains in the hydrochloride and is extracted with acetone. The acetone and toluene solutions are combined and the solvents are removed in vacuo. The resulting crude carbonate is subjected to a rapid distillation at 150–170° C. at a pressure of 1–2 mm. Hg. Further purification by crystallization from chloroform results in a solid product, namely, 4-nitro-4-methyl-2,6-dioxacyclohexanone. Examination of the infrared spectrum, analysis for the carbonate group, and elemental analysis is consistent with the molecular structure of the subject compound.

EXAMPLE II (A) In the same manner as in Example IA, there is reacted one mol of 1-nitro-propane and 162 grams of 37.5 percent Formalin solution (2 mols of formaldehyde). Upon recrystallization from water, the resulting 2-nitro-2-ethyl-1,3-propanediol melts at 56° C.

(B) Under the conditions outlined in Example IB there is reacted 0.5 mol of 2-nitro-2-ethyl-1,3-propanediol with 0.5 mol of phosgene. The nitro carbonate is recovered by distillation at 1–2 mm. Hg and a pot temperature of 150–160° C. Further purification by crystallization from chloroform results in a solid product namely, 4-nitro-4-ethyl-2,6-dioxacyclohexanone. Examination of the product by infrared analysis, analysis for the carbonate group, and elemental analysis are consistent with the molecular structure of the subject compound.

EXAMPLE III (A) One mol of 2-methyl-2-nitro-1,3-propanediol is dissolved in 500 milliliters of alcohol and charged to a 3-liter hydrogenation rocker-bomb. Five grams of Raney-nickel is added to the bomb, the reactants are heated to 90° C. and 100 p.s.i. of hydrogen pressure is applied while the bomb is agitated. After hydrogen uptake ceases, the bomb is cooled to room temperature, the product is discharged, and the catalyst is removed by filtration. Volatiles like solvent and water are removed by distillation in vacuo. The resulting 2-amino-2-methyl-1,3-propanediol after further purification by recrystallization from water melts at 108–109° C.

(B) One half mol of 2-amino-2-methyl-1,3-propanediol, 200 milliliters of water, and one mol of sodium hydroxide are charged to a reaction flask. One mol of allyl chloride is added dropwise to the well-agitated reactants while the temperature is maintained at 30–40° C. After completion of the addition, the reactants are heated to 70° C. for 1 hour. The reactant mixture is cooled to room temperature and the allylated amine mixture is separated from the aqueous phase by continuous extraction with ethyl ether over a period of 48 hours. The ether extract is evaporated and the allyl amines are separated by distillation at a pressure of 1–2 mm. Hg. The resulting 2-(N,N-diallylamino)-2-methyl-1,3-propanediol is identified by examination of its infrared spectrum, by analysis of hydroxyl content via phthalic anhydride, and by elemental analysis.

(C) One quarter mol of 2-(N,N-diallylamino)-2-methyl-1,3-propanediol, three eight mol of diethyl carbonate, and 0.5 gram of sodium are charged to a 4-neck flask equipped with stirrer, thermometer, and distillation column. The reactant mixture is heated to about 100° C., and over a period of 3 hours the resulting ethanol coproduct is removed via distillation. The reactant mixture is then subjected to a vacuum to remove remaining alcohol and excess diethyl carbonate. The pot temperature is increased to 150–160° C. while the resulting cyclic carbonate is removed via distillation at a pressure of 1–3 mm. Hg. Further purification by distillation at 1 mm. Hg results in the subject compound, namely, 4-(N,N-diallylamino)-4-methyl-2,6-dioxacyclohexanone. Examination of the product by means of infrared, analysis for the carbonate group, and elemental analysis is consistent with the molecular structure of the subject compound.

EXAMPLE IV

One-half mol of 2-nitro-2-ethyl-1,3-propanediol obtained according to the procedure set forth in Example II, 1.5 mols of acetaldehyde, 70 milliliters of glacial acetic acid, 750 millilitres of ethanol, and 0.5 gram of platinum oxide are charged to a hydrogenation rocker-bomb. The reactants are held at 25° C. and 50 p.s.i. of hydrogen pressure is applied to the agitated reactants until hydrogen uptake essentially ceases. After discharge of the reactant mixture, 85 milliliters of concentrated hydrochloric acid in 400 milliliters of water is added and the catalyst is removed by filtration. The resulting filtrate is made alkaline by careful addition of 30 percent sodium hydroxide. The resulting ethylated amine is removed from the aqueous phase by continuous extraction with ethyl ether for a period of 48 hours. The resulting ether extract is evaporated to remove the ethyl ether and the alkylated amine is subjected to distillation at 1–2 mm. Hg. The resulting solid 2-(N,N-diethylamino)-2-ethyl-1,3-propanediol is identified by elemental analysis and analysis for hydroxyl content with phthalic anhydride. It is pointed out that the use of RCHO (wherein R is, for example, hydrogen or alkyl) in lieu of acetaldehyde gives 2-(N,N-dialkylamino)-2-ethyl-1,3-propanediol. Other well known hydrogenation catalysts can be employed in lieu of platinum oxide.

(B) To a flask equipped with stirrer, thermometer, and distillation column, there is charged one quarter mol of 2-(N,N-diethylamino)-2-ethyl-1,3-propanediol, three eight mol of diethyl carbonate, and 0.5 gram of sodium. The reactant mixture is heated to about 100° C., and over a period of 3 hours the resulting ethanol coproduct is removed via distillation. After removal of excess diethyl carbonate in vacuo, the pot temperature is increased to 150–160° C. The resulting cyclic carbonate is recovered by distillation at 1–3 mm. Hg. Further purification by redistillation at 1 mm. Hg results in the subject compound, namely, 4-(N,N-diethylamino)-4-ethyl-2,6-dioxacyclohexanone. Examination of the subject compound by means of infrared analysis, analysis for the carbonate group, and by elemental analysis is consistent with its structure.

EXAMPLE V (A) To a reaction flask equipped with stirrer, condenser, and thermometer are charged 2 mols of tris(hydroxymethyl)nitro ethane and 1500 milliliters of dioxane. One mol of sodium methoxide is then added, the reactant mixture is heated to 80° C., and the coproduct methanol is removed via distillation. The reactants are then cooled to 10° C. and one mol of allyl chloride is added over a period of one hour while the reactants are well agitated. The reactants are heated to reflux and agitated for one hour. The dioxane is now removed via distillation and the product mix is diluted with 200 milliliters of water. The reactant mixture is subjected to a continuous extraction with chloroform for a period of 48 hours. The chloroform extract is dried, the chloroform is removed via distillation and the residue is subjected to a vacuum of 1 mm. Hg at which pressure the allyl ether is separated from the excess tris(hydroxymethyl)nitroethane by distillation. The resulting 2-nitro-2-allyloxymethyl-1,3-propanediol is a solid product which is identified by elemental analysis and by analysis of the hydroxyl groups with phthalic anhydride.

(B) To a flask equipped with stirrer, thermometer, and Dry Ice condenser, there is charged one half mol of 2-nitro-2-allyloxymethyl-1,3-propanediol, and reacted with one half mol of phosgene as set forth in Example IB. The resulting cyclic carbonate is recovered by distillation at 150–170° C. and 1–3 mm. Hg. Further purification by redistillation results in the subject carbonate, namely, 4-nitro-4-allyloxymethyl-2,6-dioxacyclohexanone. Examination of the subject compound by means of infrared analysis, analysis for the carbonate group, and by elemental analysis is consistent with its structure.

EXAMPLE VI (A) The procedure of Example VA is repeated except that one mol of crotyl chloride is employed instead of allyl chloride. The resulting 2-nitro-2-crotyloxymethyl-1,3-propanediol is a solid product which is identified by elemental analysis.

(B) According to the procedure given in Example IB, one half mol of 2-nitro-2-crotyloxymethyl-1,3-propanediol is reacted with one half mol of phosgene. The reaction product is recovered in essentially identical manner. The resulting solid cyclic carbonate, 4-nitro-4-crotyloxymethyl-2,6-dioxacyclohexanone, is identified by elemental analysis, by examination of its infrared spectrum, and by analysis for the carbonate group.

EXAMPLE VII (A) The procedure of Example VA is repeated except that one mol of benzyl chloride is employed instead of allyl chloride. The resulting 2-nitro-2-benzyloxymethyl-1,3-propanediol is a solid product which is identified by elemental analysis.

(B) According to the procedure set forth in Example IB, one half mol of 2-nitro-2-benzyloxymethyl-1,3-propanediol is reacted with one half mol of phosgene. The reaction product is Example IB. The resulting solid cyclic carbonate, 4-nitro-4-benzyloxymethyl-2,6-dioxacyclohexanone, is identified by elemental analysis, by examination of its infrared spectrum, and by analysis for the carbonate group.

What is claimed is:
1. A compound of the formula

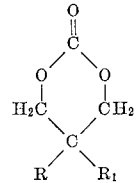

wherein R is nitro, and wherein $R_1$ is of the group consisting of alkenyl of up to 8 carbon atoms; alkenyloxymethyl, the alkenyl moiety of which contains up to 8 carbon atoms; cycloalkenyloxymethyl, the cycloalkenyl nucleus of which contains from 5 to 6 carbon atoms; and alkenylbenzyloxymethyl, the alkenyl moiety of which contains from 2 to 5 carbon atoms.

2. 4-nitro-4-alkenyl-2,6-dioxacyclohexanone.
3. 4 - nitro - 4 - alkenyloxymethyl - 2,6 - dioxacyclohexanone, the alkenyl moiety of which contains up to 8 carbon atoms.
4. 4-nitro-4-cycloalkenyloxymethyl - 2,6 - dioxacyclohexanone, the cycloalkenyl nucleus of which contains from 5 to 6 carbon atoms.
5. 4-nitro-4-alkenylbenzyloxymethyl - 2,6 - dioxacyclohexanone, the alkenyl moiety of which contains from 2 to 5 carbon atoms.
6. 4-nitro-4-allyl-2,6-dioxacyclohexanone.
7. 4-nitro-4-allyloxymethyl-2,6-dioxacyclohexanone.

References Cited

Jour. Org. Chemistry, vol. 28 (9), pp. 2491–4, Sept. 12, 1963.

NORMA S. MILESTONE, *Primary Examiner.*

U.S. Cl. X.R.

260—77.5, 635, 584, 615, 348, 2